United States Patent
Lei (10) Patent No.: US 11,276,161 B2
(45) Date of Patent: Mar. 15, 2022

(54) REFERENCE IMAGE GENERATION FOR SEMICONDUCTOR APPLICATIONS

(71) Applicant: KLA Corporation, Milpitas, CA (US)

(72) Inventor: Fang Lei, Singapore (SG)

(73) Assignee: KLA Corp., Milpitas, CA (US)

( * ) Notice: Subject to any disclaimer, the term of this patent is extended or adjusted under 35 U.S.C. 154(b) by 224 days.

(21) Appl. No.: 16/795,553

(22) Filed: Feb. 19, 2020

(65) Prior Publication Data

US 2020/0273156 A1 Aug. 27, 2020

Related U.S. Application Data

(60) Provisional application No. 62/810,759, filed on Feb. 26, 2019.

(51) Int. Cl.
*G06T 7/00* (2017.01)

(52) U.S. Cl.
CPC .... *G06T 7/001* (2013.01); *G06T 2207/30148* (2013.01)

(58) Field of Classification Search
CPC ........... G06T 7/001; G06T 2207/30148; G06T 2207/10061
See application file for complete search history.

(56) References Cited

U.S. PATENT DOCUMENTS

| | | | |
|---|---|---|---|
| 6,691,052 B1 * | 2/2004 | Maurer | G03F 1/84 702/81 |
| 7,570,796 B2 | 8/2009 | Zafar et al. | |
| 7,676,077 B2 | 3/2010 | Kulkarni et al. | |
| 8,126,255 B2 | 2/2012 | Bhaskar et al. | |
| 9,222,895 B2 | 12/2015 | Duffy et al. | |
| 2003/0104288 A1 * | 6/2003 | Pang | G06T 7/97 430/5 |
| 2003/0228045 A1 * | 12/2003 | Asai | G06K 9/4647 382/141 |
| 2010/0096550 A1 | 4/2010 | Yamazaki et al. | |

(Continued)

FOREIGN PATENT DOCUMENTS

| | | |
|---|---|---|
| KR | 10-2004-0026157 | 3/2004 |
| KR | 10-2008-0056149 | 6/2008 |

OTHER PUBLICATIONS

International Search Report for PCT/US2020/019564 dated Jun. 16, 2020.

*Primary Examiner* — Carol Wang
(74) *Attorney, Agent, or Firm* — Ann Marie Mewherter (57) ABSTRACT

Methods and systems for generating a reference image for use in a process performed for a specimen are provided. One system includes a virtual system configured to receive output generated by actual systems for specimens, each of which has device areas of the same type formed thereon. The virtual system is configured for identifying defective portions of the device areas based on the output generated for the specimens by at least two of the actual systems and eliminating the defective portions of the device areas from the device areas in which the defective portions were identified to thereby generate remaining portions of the device areas. In addition, the virtual system is configured for generating a reference image from the output generated for the remaining portions of at least one device area on a first of the specimens and at least one device area on a second of the specimens.

23 Claims, 5 Drawing Sheets

(56) References Cited

U.S. PATENT DOCUMENTS

| | | | |
|---|---|---|---|
| 2010/0188499 A1* | 7/2010 | Amanullah | G01N 21/9501 |
| | | | 348/87 |
| 2013/0070078 A1* | 3/2013 | Takagi | G06T 7/001 |
| | | | 348/80 |
| 2013/0093878 A1 | 4/2013 | Tsuchiya et al. | |
| 2014/0270469 A1* | 9/2014 | Rotem | G03F 7/70633 |
| | | | 382/145 |
| 2015/0221076 A1* | 8/2015 | Gao | G06T 7/001 |
| | | | 382/149 |
| 2016/0061745 A1 | 3/2016 | Chen et al. | |
| 2019/0252270 A1* | 8/2019 | Hoo | G06F 30/39 |

* cited by examiner

REFERENCE IMAGE GENERATION FOR SEMICONDUCTOR APPLICATIONS

BACKGROUND OF THE INVENTION

1. Field of the Invention

This invention generally relates to methods and systems for generating a reference image for use in a process performed for a specimen.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, semiconductor manufacturing processes may also be operating closer to the limitations on the performance capability of the processes. In addition, at smaller design rules, process induced failures may, in some cases, tend to be systematic. That is, process induced failures tend to fail at predetermined design patterns often repeated many times within the design. Detection and elimination of spatially systematic, electrically relevant defects is important because eliminating such defects can have a significant overall impact on yield.

Currently performed detection of systematic and other repeater defects using inspection techniques such as die-to-die inspection and die to standard reference die inspection have a number of disadvantages. For example, although die-to-die inspection techniques have achieved wide spread success in wafer inspection for detection of random defects, by their very nature such inspection techniques are unable to detect systematic and repeater defects. In particular, by comparing two test die to each other, systematic and repeater defects that occur in both test die cannot be detected. Standard reference die inspection is in theory able to detect systematic and other repeater defects, but as described below, such techniques have their own challenges.

Standard reference dies are currently created using single die or multi-die information from a single wafer to generate the standard reference image. For example, in a current method for generating a standard reference die, a setup wafer may be scanned using an inspection system. The images or image data generated for multiple dies formed on the one setup wafer may be combined by determining values such as median or mean intensity values as a function of within die position to thereby generate the standard reference die. The standard reference die may then be stored and used for inspection in which the standard reference die is compared to dies on other specimens.

Die to standard reference die inspection techniques have been adopted much less than die-to-die inspection techniques in semiconductor manufacturing related applications because it is often difficult to acquire a suitable standard reference die. For example, there is a high risk that the standard reference die is defective, i.e., it is highly likely that the standard reference die is affected by any defects that are present on the setup wafer, which can decrease the ability to detect systematic and other repeater defects using the standard reference die and can skew the inspection results in general. In addition, unlike die-to-die inspection techniques in which the output for the dies that are compared is typically acquired in the same inspection scan of a wafer, die to standard reference die techniques often are complicated due to differences between the test die and the standard reference die (or the test wafer and the standard reference wafer) such as color variations and due to the difficulty in achieving relatively accurate alignment between the test die and the standard reference die. Furthermore, by generating the standard reference die from only a single setup wafer as is currently done, the images or image data used to generate the standard reference die cannot present process variation that can occur from wafer-to-wafer. In other words, a single setup wafer may be able to present process variations across the wafer, but it is impossible to capture any wafer-to-wafer process variations that may occur during fabrication of the wafers using only a single wafer. Therefore, if there is any drift in the wafer fabrication process, the standard reference die inspection may detect numerous nuisances (drift in wafer characteristics) that are not actually defects and may be rendered useless requiring a new standard reference die to be generated.

Accordingly, it would be advantageous to develop systems and/or methods for generating a reference image for use in a process performed on a specimen that do not have one or more of the disadvantages described above.

SUMMARY OF THE INVENTION

The following description of various embodiments is not to be construed in any way as limiting the subject matter of the appended claims.

One embodiment relates to a system configured to generate a reference image for use in a process performed for a specimen. The system includes a virtual system coupled to actual systems to thereby receive output generated by the actual systems for specimens. The virtual system includes at least a computer system and a storage medium. The virtual system is not capable of having the specimens disposed therein. Each of the specimens has device areas of the same type formed thereon. The output generated by the actual systems for the specimens is for the same layer on the specimens. The virtual system is configured for identifying defective portions of the device areas based on the output generated for the specimens by at least two of the actual systems. The virtual system is also configured for eliminating the defective portions of the device areas from the device areas in which the defective portions were identified to thereby generate remaining portions of the device areas. In addition, the virtual system is configured for generating a reference image from the output generated for the remaining portions of at least one of the device areas on a first of the specimens and at least one of the device areas on a second of the specimens. The output used to generate the reference image is generated by only one of the actual systems. The system may be further configured as described herein.

Another embodiment relates to a computer-implemented method for generating a reference image for use in a process performed for a specimen. The method includes receiving output generated by actual systems for specimens. Each of the specimens has device areas of the same type formed thereon, and the output generated by the actual systems for the specimens is for the same layer on the specimens. The method also includes identifying defective portions of the device areas based on the output generated for the specimens by at least two of the actual systems. In addition, the method includes eliminating the defective portions of the device areas from the device areas in which the defective portions were identified to thereby generate remaining portions of the device areas. The method further includes generating a reference image from the output generated for the remaining portions of at least one of the device areas on a first of the specimens and at least one of the device areas on a second of the specimens. The receiving, identifying, eliminating, and generating are performed by a virtual system coupled to the actual systems. The virtual system includes at least a computer system and a storage medium. The virtual system is not capable of having the specimens disposed therein.

The method may be performed as described further herein. In addition, the method may include any other step(s) of any other method(s) described herein. Furthermore, the method may be performed by any of the systems described herein.

An additional embodiment relates to a non-transitory computer-readable medium storing program instructions executable on a computer system for performing a computer-implemented method for generating a reference image for use in a process performed for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by a semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to generate a reference image for use in a process performed for a specimen. In one embodiment, the specimen includes a wafer. The wafer may include any wafer known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

The system includes a virtual system coupled to actual systems to thereby receive output generated by the actual systems for specimens. The virtual system is configured for performing one or more virtual processes while the actual systems are configured for performing one or more actual processes. In general, "actual systems" as that term is used herein refers to systems that perform a process, i.e., an actual process, on or using an actual, physical specimen. In contrast, a "virtual system" as that term is used herein refers to a system that performs a process, i.e., a virtual process, for a specimen without using or interacting with the actual, physical specimen.

The system may or may not include the actual systems that are configured to perform one or more processes on the specimens while the specimens are disposed within the actual systems to thereby generate the output for the specimens. In general, the one or more processes performed on the specimens by the actual systems are yield control-related processes such as inspection, review, metrology, testing, and the like. The processes performed by the actual systems are not meant to include processes that are performed by reticle or wafer fabrication tools that alter one or more characteristics of the reticle or wafer. For example, a wafer removed from a wafer inspection tool will have substantially the same characteristics as it did when it was placed inside the wafer inspection tool (unless, of course, something goes terribly wrong). However, there may be some instances in which a yield-control related process may alter one or more characteristics of the specimen, but those characteristics that are altered are not meant to alter the function of devices being formed on or with the specimen. For example, intentional "burn marks" may be left by a scanning electron microscope (SEM) to aid in subsequent relocation of a specific point. In contrast, a wafer removed from a fabrication tool will typically have different characteristics (physical, chemical, and the like) than it did when it was placed inside the fabrication tool (again, unless something goes wrong such as process fail) that will alter the characteristic(s) of devices being formed on or with the specimen.

Since the actual systems perform the processes on the specimens while the specimens are disposed within the actual systems, the actual systems will include some sort of specimen handling device or subsystem (such as a stage, a motor driving the stage, a wafer or reticle handling robot, etc.). The specimen handling device or subsystem will generally control the position of the specimen within the actual system. In this manner, the actual systems described herein are configured to perform process(es) on the physical specimen itself, which is in contrast to the virtual systems described further herein that do not interact with the physical specimens even though they can perform one or more functions for the physical specimens.

Performing the processes on the specimens with the actual systems will generally cause some output (e.g., images, data, image data, signals, image signals, etc.) to be generated by the actual systems. For example, during a process, a detector or sensor of an actual system may generate one or more images of a specimen. The actual systems may also include one or more computer subsystems that perform some function, algorithm, or method on the output generated by the one or more detectors or sensors of the actual systems. For example, a computer subsystem of an actual system may perform defect detection for a specimen using output generated by a detector of the actual system. The results of that defect detection or any other function, method, or algorithm may also be output from the actual systems as described further herein. Therefore, the actual systems described herein may produce a variety of output, all or only some of which may be received by a virtual system as described further herein.

Figure 1:
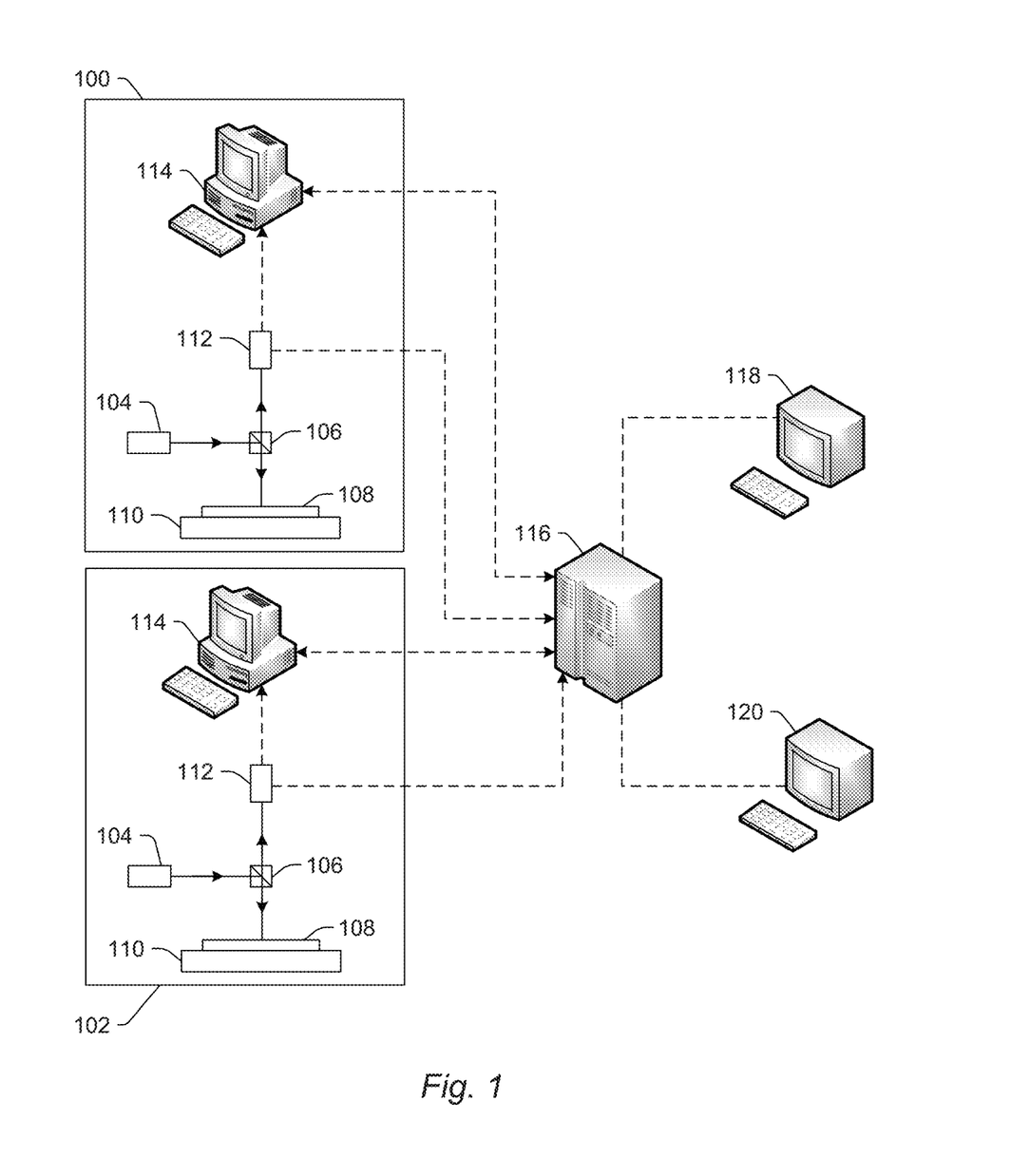
FIG. 1 is a schematic diagram illustrating a side view of an embodiment of a system configured as described herein.

In one embodiment, the actual systems include two of the same systems. For example, as shown in FIG. 1, the system may include two actual systems 100 and 102. In this embodiment, each of the two actual systems includes light source 104 configured to generate light. The actual systems also include beam splitter 106 that is configured to direct light from the light source to specimen 108. Specimen 108 is supported within each of the actual systems by stage 110. Light reflected, scattered, diffracted, or otherwise returned from the specimen may be transmitted by beam splitter 106 to detector 112, which is included in each of the actual systems. The detectors are configured to generate output such as images, image data, signals, or any other suitable output responsive to the light detected by the detectors.

The output of the detectors may be received by computer subsystems 114 included in each of the actual systems. Computer subsystems 114 may be coupled to each of the detectors in any suitable manner. The computer subsystems may be configured to determine one or more characteristics of the specimen using the output of the detectors. The one or more characteristics that are determined by the computer subsystems will vary depending on the configuration of the actual systems and the specimens on which an actual process is being performed.

The actual systems shown in FIG. 1, therefore, have the same configuration and therefore may be the same type of system. In another embodiment, the actual systems include two systems having different configurations. For example, any of the elements of the actual systems shown in FIG. 1 may be selected to be different. In one such example, the actual systems may have different types of light sources, may be configured to perform one or more processes on different specimens, may have different detectors, etc. In general, the actual systems coupled to the virtual system may include any type of actual systems in any numbers and combinations. In addition, the actual systems may each be configured as physically separated systems, which may be coupled by other hardware or software as described further herein.

It is noted that FIG. 1 is provided herein to generally illustrate one configuration of the actual systems that may be coupled to the virtual system in the embodiments described herein. Obviously, the actual system configurations described herein may be altered to optimize the performance of the actual systems as is normally performed when designing a yield control-related system for the specimens described herein. In addition, the systems described herein may be implemented using existing actual systems (e.g., by adding functionality described herein to existing actual systems) such as the tools that are commercially available from KLA, Milpitas, Calif. Alternatively, the actual systems described herein may be designed "from scratch" to provide completely new actual systems.

The actual systems that generate output received and used by the virtual system in embodiments described herein may include different combinations of actual systems. In general, however, for the embodiments described herein, at least one of the actual systems is configured as some kind of inspection system. For example, in one embodiment, the actual systems include at least one inspection tool and at least one other tool. In one such embodiment, the at least one other tool includes a defect review tool. In another such embodiment, the at least one other tool includes a different inspection tool. In a further such embodiment, the at least one other tool includes an electrical tester. In some embodiments, the at least one other tool includes a combination of two or more of a defect review tool, a different inspection tool, and an electrical tester. These embodiments may be configured as described further herein.

Figure 2:
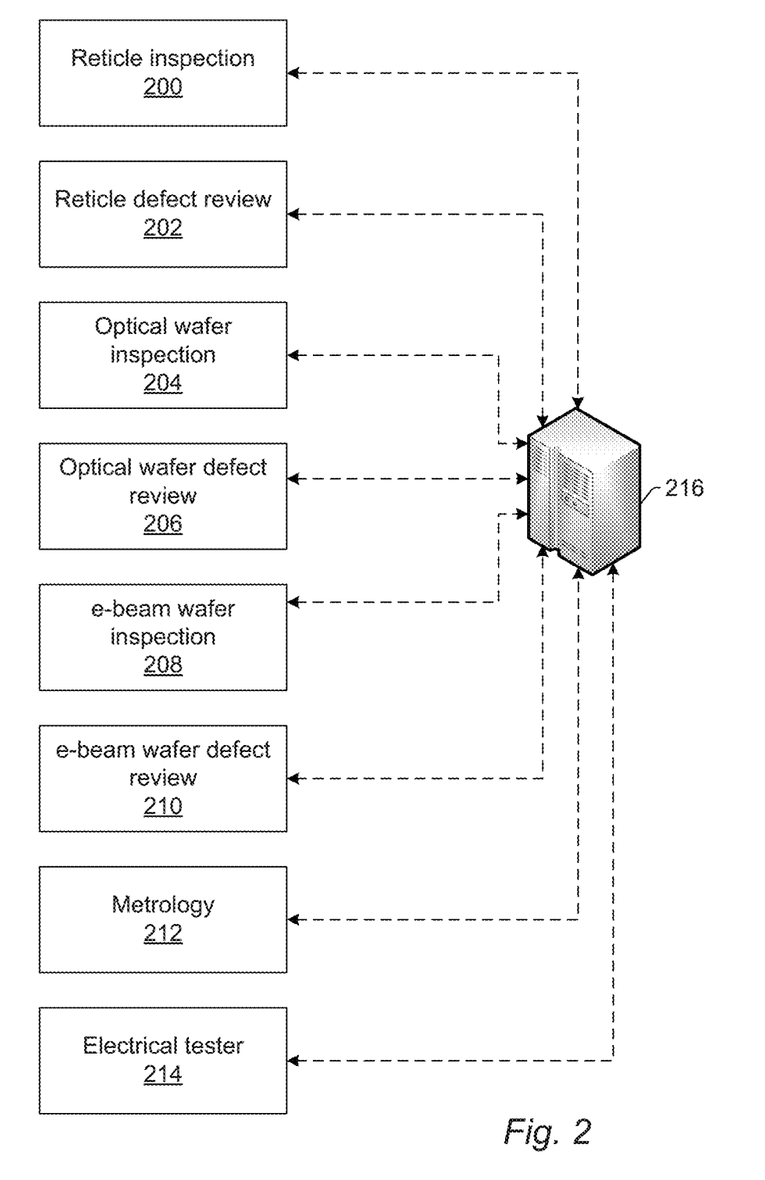
FIG. 2 is a block diagram illustrating a side view of an embodiment of a system configured as described herein.

In one embodiment, the actual systems include at least one reticle inspection tool, and the at least one other tool includes a reticle defect review tool. For example, as shown in FIG. 2, the actual systems may include reticle inspection tool 200 and reticle defect review tool 202. The reticle inspection and defect review tools may be optical-based tool(s) and/or electron beam-based tool(s). Furthermore, the same actual system may be configured as both a reticle inspection tool and a reticle defect review tool. The reticle inspection and/or defect review tool may include any suitable commercially available systems. In addition, the reticle inspection and/or defect review tools may be configured to perform any kind of inspection and/or review. The reticle inspection and/or defect review tools may be configured to generate output, e.g., images or data, for the reticle in one or multiple imaging modes.

In some embodiments, the actual systems include at least one wafer inspection tool, and the at least one other tool includes a wafer defect review tool. The wafer inspection and wafer defect review tool(s) may be light-based tool(s). For example, as shown in FIG. 2, the actual systems may include optical wafer inspection system 204 and optical wafer defect review system 206. In addition, the same actual system may be configured as both a wafer inspection tool and a wafer defect review tool. The light-based wafer inspection and/or defect review tools may include any suitable commercially available systems such as the Puma systems, the 29xx and 39xx systems, and the SPx, Surfscan, and Surfimage systems that are commercially available from KLA. In addition, the light-based wafer inspection and/or defect review tools may be configured to perform any kind of inspection and/or review such as dark field (DF) laser scattering, narrow band bright field (BF), broadband BF, etc. The light-based wafer inspection and/or defect review tools may also include any suitable light source such as a broadband plasma (BBP)-based light source. The wafer inspection and/or defect review tools may be configured to generate output (e.g., images or data) for the wafer in one or multiple imaging modes.

In another embodiment, the actual systems include at least one wafer inspection tool and a wafer defect review tool, and the at least one wafer inspection tool and wafer defect review tool are configured as electron beam-based tool(s). For example, as shown in FIG. 2, the system may include e-beam wafer inspection tool 208 and/or e-beam wafer defect review tool 210. In addition, the same actual system may be configured as both a wafer inspection tool and a wafer defect review tool. The electron beam-based wafer inspection and/or defect review tool(s) may include any suitable commercially available systems such as the eDRxxxx systems that are commercially available from KLA.

In some embodiments, the actual systems include at least one metrology tool. For example, as shown in FIG. 2, the actual systems may include metrology tool 212. The metrology tool may include any suitable commercially available metrology tool. The metrology tool may be configured to measure or determine any one or more characteristics of any of the specimens described herein. For example, the metrology tool may be configured as a scatterometry system that is configured to measure or determine a critical dimension or critical dimension uniformity of patterned features on a wafer. Metrology tools are generally different than inspection tools in that the metrology tools do not scan over wafers or reticles generating output at each location that is scanned. Instead, metrology tools often perform measurements at one or a limited number of measurements spots on a wafer or reticle in a move-acquire-measure type scenario. In some instances, the metrology tool may perform measurements based on output or results of another actual system described herein. For example, the metrology tool may be used to measure one or more characteristics of defects detected by inspection. Control of the metrology tool in this manner may be further performed as described herein.

In a further embodiment, the actual systems include at least one electrical tester. For example, as shown in FIG. 2, the actual systems may include electrical tester 214. The electrical tester may include any suitable commercially available electrical testing system. The electrical tester may be a contact type system in which one or more elements of the system make contact with one or more device structures formed on a specimen such as a wafer in order to establish an electrical connection between the wafer and the tester. Alternatively, the electrical tester may be a non-contact type system in which none of the elements makes contact with the wafer during the testing.

Although a variety of specific tools that may be the actual systems are described herein, it is to be understood that the invention is not limited to these specific tools. For example, it is conceivable that any actual system configured to perform one or more processes on a wafer, reticle, or other specimen described herein may be included in the actual systems. In one such example, the actual systems may also include failure analysis tools and/or materials analysis tools. In addition, the actual systems are not limited to light- and electron beam-based tools. For example, the actual systems may include ion beam-based tools such as commercially available focused ion beam (FIB) systems, helium ion microscopy (HIM) systems, and secondary ion mass spectroscopy (SIMS) systems.

The system also includes a virtual system coupled to the actual systems to thereby receive output generated by the actual systems. For example, as shown in FIG. 1, actual systems 100 and 102 are coupled to virtual system 116. In one embodiment, detectors 112 of the actual systems may be coupled to the virtual system so that output of the detectors may be sent directly to the virtual system. In this manner, the virtual system may receive raw output of the detectors (i.e., output that has not been altered by any data, signal, or other processing). In addition or alternatively, computer subsystems 114 of the actual systems may be coupled to the virtual system so that the computer subsystems can send output of the detectors and/or any other information generated by the computer subsystems to the virtual system. The virtual system may also be coupled to a computer subsystem, detector(s), and any other elements of an actual system. The virtual system may be coupled to any components of the actual systems as described further herein. For example, virtual system 116 may be coupled to computer subsystem(s) 114 as shown by the dashed lines in FIG. 1 by any suitable transmission media, which may include any suitable wired and/or wireless transmission media known in the art.

As described above, the actual systems may include a variety of different actual systems in various combinations.

Therefore, the output received from the actual systems may be different and vary depending on the configuration of the actual systems and/or the actual process(es) performed on the specimens by the actual systems. For example, the output may include mapping of spatially continuous data (such as may be generated by a scanning actual system), spatially discrete data (such as may be generated by a move-acquire-measure system), metrology data, point defect detection data, etc.

The virtual system includes at least a computer system and a storage medium. The term "computer system" is used interchangeably herein with the term "computer subsystem." Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a stand-alone or a networked tool. The storage medium may include any suitable storage medium known in the art or described further herein.

Although the virtual systems are shown in the figures as having a particular computer configuration, it is to be understood that the virtual systems may have any suitable computer-like configuration. For example, the virtual system shown in FIG. 1 may be formed of only the processor, memory, and input/output components of the virtual system but not any components that can accept user input (e.g., keyboards, mice, screens, etc.). In this manner, the virtual system may not include all of the components that would normally make up a free-standing fully functional computer system. However, in other instances, the virtual system may resemble a fully functioning computer system in that a user can use the virtual system directly to perform one or more functions using any of the data stored therein. In addition, more than one workstation or user can access the virtual system simultaneously, remotely, and/or wirelessly. For example, as shown in FIG. 1, multiple workstations 118 and 120 can be coupled to the virtual system simultaneously. In this manner, multiple users may access the virtual system or data stored therein and use the virtual system to perform one or more of the functions described further herein.

The virtual system is not capable of having the specimens disposed therein. For example, although the virtual system is configured to perform one or more functions for the specimens, the virtual system is not configured to perform the one or more functions on the specimens. Instead, the one or more functions for the specimens may be performed on data or other output produced by an actual process performed on the specimens by an actual system. Therefore, unlike the actual systems described herein, the virtual system may not have any specimen handling capabilities such as stages, motors coupled to stages, specimen handling devices or robots, or the like. In addition, although the virtual system may be configured to control one or more of the actual systems such that the actual system(s) perform process(es) on actual specimens, the virtual system cannot in of itself perform any actual processes on actual specimens. In one such embodiment, the virtual system may be configured as a virtual inspector (VI or VIVA). A VI can be generally defined as a computer system that can store massive amounts of output generated for a specimen by an inspection subsystem such that the output can be "played back" in a manner that mimics real time acquisition of the output during which a virtual inspection can be performed for the specimen using only the stored output.

The virtual system and the actual systems may be further configured as described in U.S. Pat. No. 8,126,255 issued on Feb. 28, 2012 to Bhaskar et al. and 9,222,895 issued on Dec. 29, 2015 to Duffy et al., which are incorporated by reference as if fully set forth herein.

As described above, the virtual system is configured to receive output generated by the actual systems for specimens. The output that is used as described further herein by the virtual system to generate a reference image for use in a process performed for a specimen should therefore be output generated by the actual systems for specimens having the same layer formed thereon as the specimen will when the process is performed on it. In this manner, each of the specimens should also be of the same type as each other and the specimen. For example, each of the specimens has device areas of the same type formed thereon, and the output generated by the actual systems for the specimens is for the same layer on the specimens. In one such example, each of the specimens should be fabricated for the same device type and layer as each other and the specimen.

The device areas may be different types of device areas depending on the configuration of the specimens and how the reference image that is being generated will be used in the process for the specimen. For example, in one embodiment, the device areas are dies on the specimen. In another embodiment, the device areas are fields on the specimen. In an additional embodiment, the device areas are cells on the specimen. In particular, the reference images generated as described herein may be used for processes such as inspection. Inspection may be performed in a variety of different ways depending on the configuration of the devices being formed on the specimen. For example, in some instances, a die-to-die type inspection may be suitable for a specimen if the device area on the specimen includes large areas of non-repeating (e.g., logic) features and/or if the entire die area is to be inspected. In another example, a field-to-field type inspection may be suitable for a specimen if the device areas on the specimen include multiple fields having the same design. In a further example, a cell-to-cell type inspection may be suitable for a specimen that includes numerous, relatively small areas containing the same patterned features that repeat within a die or larger area on the specimen. In this manner, the term "device area" as used herein is defined as an area on the specimens in which a device is being formed, in which at least multiple patterned features are located, and which repeats across the specimens at some predetermined frequency.

The reference images described herein may also be referred to in other ways depending on the device area for which they are generated. For example, if the device area is a die, the reference image may also be referred to as a "golden die" image or a "standard" reference die. Similar terms may also be used for other device areas described above.

The virtual system is configured for identifying defective portions of the device areas based on the output generated for the specimens by at least two of the actual systems. For example, as shown in step 300 in FIG. 3, the actual systems may be configured for performing multi-specimen scans, and the virtual system may perform VIVA recording of the multi-specimen scan results from the actual systems. In other words, one or more of the actual systems may scan multiple specimens, perform a defect detection process using results of the scanning, and transmit the results of the scanning and defect detection to the virtual system, which receives and stores the results. In addition, after a number of the specimens sufficient for generating a reference image as described herein have been scanned, the results of those scans including images, image data, or image signals and defect detection results may be received by and stored in the VIVA. In this manner, the identifying and other steps described herein may not be performed until after a sufficient number of specimens have been scanned and the information generated for those specimens has been received by and stored in the VIVA. In this manner, the virtual system receives the output generated by one or more of the actual systems for defects detected on multiple specimens.

The number of specimens that are scanned for the reference image generation described herein may be less important than the number of device areas that are scanned (as long as at least two specimens are scanned). For example, the number of device areas on a specimen may vary from specimen type to specimen type and depending on the type of device area (e.g., dies are typically much, much larger than cells). In general, the number of device areas that are used for the reference image generation described herein is preferably between about 10 to 20 device areas that are not eliminated as described further herein and preferably have little to no defectivity. In other words, the number of "perfect" or "near perfect" device areas that are preferably used for reference image generation is about 10 to 20. As such, at least 10 to 20 (and possibly substantially more) device areas are preferably scanned and examined for defectivity as described herein to identify about 10 to 20 device areas that are suitable for reference image generation. While many specimens may have at least 10 to 20 device areas formed thereon and while, in theory, the embodiments described herein may be able to find 10 to 20 perfect or near perfect device areas on any one specimen, as noted herein, one advantage of the embodiments described herein is that they can be used to reduce the effects of specimen-to-specimen changes on the usefulness of the reference image. Therefore, even if 10 to 20 perfect or near perfect device areas may be found on a single specimen, the embodiments described herein still do not use only device areas from a single specimen for reference image generation.

Figure 3:
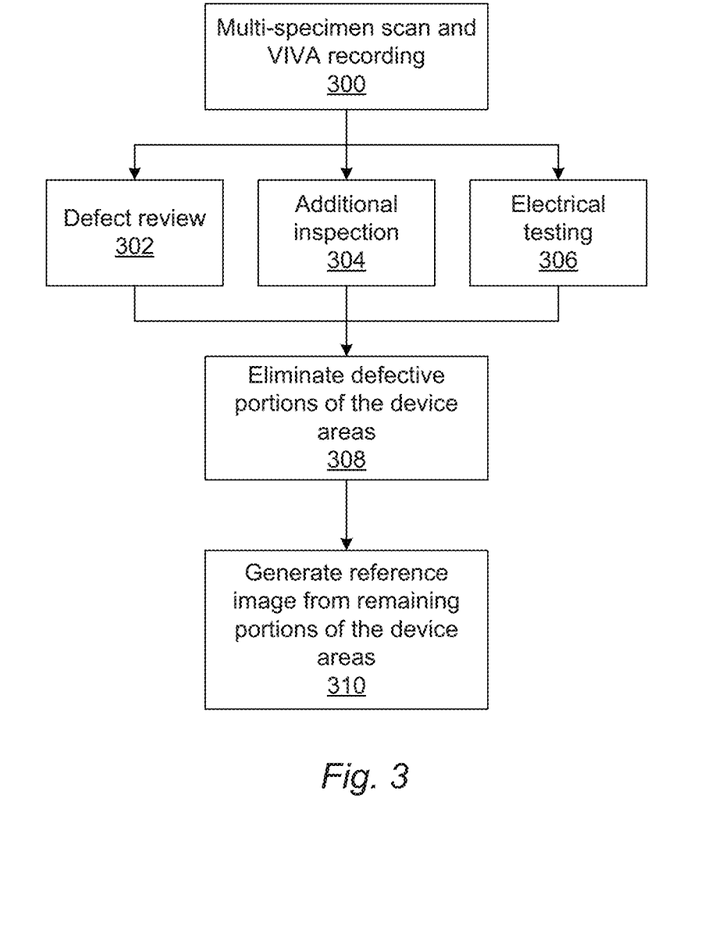
FIG. 3 is flow chart illustrating one embodiment of steps for generating a reference image for use in a process performed for a specimen that may be performed by the embodiments described herein.

In general, the scanning performed for initial defect detection on the specimens may be performed by one inspection tool, although more than one of the same type of inspection tool may be used for generating this data. In addition, an inspection tool that generates the multi-specimen scan results recorded in the VIVA in step 300 may be the same system that will use the generated reference image for a process performed on other specimens. The actual system(s) may perform the scanning for initial defect detection in any suitable manner, which may vary depending on the configuration of the actual systems and the specimens. The output that is generated by the actual systems and used by the virtual system for identifying the defective portions may include any results generated by the actual systems for the initial defect detection. That output may include only images, image data, image signals, raw detector output, etc. if the actual system(s) merely generate the output but do not perform defect detection using the output. For example, all of the output generated by the detector(s) of the actual system(s) may be transmitted to the virtual system, which may be configured to store that output and to use the output to perform defect detection for the specimens. In this manner, an initial defect detection may be performed by the actual system(s) or may be performed by the virtual system using output generated by the actual system(s). The virtual system may also be configured to perform defect detection using output generated by the actual system(s) in any suitable manner known in the art. If the actual system(s) perform an initial defect detection on the specimens, the output generated by the actual system(s) that is received by the virtual system may include any images, image data, image signals, raw detector output, etc. for the specimens and any results generated for the defects detected on the specimens. The results generated for the defects may include defect images, defect coordinates, any defect characteristics determined in the inspection, defect IDs, and the like and may be outputted in any suitable file format known in the art.

The virtual system may identify defective portions of the device areas based on the multi-specimen scan results and VIVA recording received in step 300. However, it would be more advantageous for the embodiments described herein if the defects that were detected in the multiple specimen scans were confirmed or verified before defective portions of the device areas were identified for use in other steps described herein. For example, as shown in step 302, one of the actual systems may perform defect review on the defects detected on the multiple specimens. Defect review may be performed in any suitable manner. For example, typically defect review is performed using a high resolution SEM for defects that were detected optically using a light-based system, but the embodiments are not limited to such actual systems. For example, the defects may be detected by a light or electron beam type inspection system in the multi-specimen scan, and the defects may be reviewed using a high resolution (i.e., a resolution higher than that with which inspection was performed) light or electron beam type defect review system. In this manner, the scan result produced by the inspection of multiple specimens may be reviewed by one or more of the actual systems described herein. In addition, the defect review may be performed by the virtual system using output generated for the detected defects by a defect review system. In other words, the defect review system may scan locations of detected defects and transmit the results of the scanning to the virtual system, and the virtual system may use the results of the scanning to re-detect the defects thereby verifying whether or not the detected defects are actual defects. Re-detecting the defects to verify whether or not the detected defects are actual defects may otherwise be performed in any manner known in the art.

The virtual system may also verify the defects detected by the multi-specimen scan and VIVA recording using an additional inspection, as shown by step 304 in FIG. 3. For example, an inspection tool other than the one that generated the initial multi-specimen scan results may be used to perform an additional scan of the same multiple specimens. The inspection tools used for the additional inspection and the initial inspection may be different in any suitable manner. For example, the inspection tools may be different types of inspection tools (e.g., a light-based inspection tool and an electron beam inspection tool). The inspection tools may also be the same type of inspection tools but have substantially different configurations (e.g., light-based inspection tools having totally different imaging configurations). In any case, the virtual system may use the results of additional inspection 304 with the multi-specimen scan results initially generated to identify which defects initially detected are more likely than not actual defects. For example, if a defect is detected at the same specimen location in the two different inspections, then a defect is most probably actually present at that location. In this manner, the initial inspection results for the multiple specimens may be reviewed in a way by combining or modifying the inspection results with those generated using another inspection tool.

In another option, the virtual system may perform defect review 302 based on the initial inspection results in addition to the additional inspection results. For example, both inspection results may be used to generate a defect sample for defect review, which can be used by one or more of the actual systems to perform a defect review scan at the locations of the defects in the sample. The virtual system or one of the actual systems configured for defect review may then perform defect review using results of the defect review scan. Performing defect review using results of the defect review scan may include re-detecting the defects to thereby verify whether the detected defects are actual defects. Such re-detecting may be performed in any suitable manner known in the art.

The virtual system may also verify the defects detected by the multi-specimen scan and VIVA recording and perform an additional defect detection using electrical testing 306. For example, in an optional step, one or more of the specimens may be sent to electrical testing. Electrical testing may be performed for any one or more of the defects that were detected on the specimen(s) by any of the inspection or defect review steps described herein. In one such example, the virtual system may generate a sample of defects for which electrical testing is performed and may transmit information for the sample to the electrical tester that performs the electrical testing for the defects in the sample. The electrical tester may then perform any suitable electrical test to determine if the physical defects detected by inspection and/or review are electrical defects (i.e., cause electrical defects or problems for the devices being formed on the specimens).

The electrical tester may also perform electrical testing for all of the device areas on all (or at least some) of the specimens. In this manner, the electrical tester may detect and identify electrical failures that may be caused by defects that were not detected by inspection. In other words, there may be defects on a specimen that are undetected by inspection and/or defect review tools if the defects are located too far beneath an upper surface of the specimen to be detected by inspection and/or defect review. Such defects may be commonly referred to as "buried" defects and SEM non-visuals (SNVs). As such, the electrical tester may detect previously undetected defects on the specimens, and such defects may be added to any of the defects detected by inspection. The defective portions of the device areas may therefore be identified based on defects detected based on the effect that they have on light or electrons used for inspection and defects detected based on the effect they have on the electrical function of the devices being formed on the specimens.

Based on any or all of the information for the defects generated by the initial inspection and one or more of defect review, a secondary inspection, and electrical testing, the virtual system identifies defective portions of the device areas based on the output generated for the specimens by at least two of the actual systems. The defective portions may include any portions of any of the device areas in which a defect has been detected and preferably verified in some manner.

The defective portions may have various characteristics based on the defects that are determined to be present on the specimens and the device areas themselves. For example, in some instances, the defective portions may be identified as only the locations in the device areas at which defects are located. In this manner, the defective portions may have shapes, sizes, areas, etc. that are the same as the defects to which they correspond. In other instances, the defective portions may have areas, dimensions, shapes, etc. that are different from the defects that they correspond to. For example, some device areas contain smaller patterned areas that repeat within the device areas and/or multiple, different areas that are smaller than the device areas. If a defect is found within one of these smaller areas, say a cell, a memory array, a logic area, or other set of patterned features, the defective portion identified for that defect may be the whole area whether that is a cell, a memory array, a logic area, etc. In this manner, the defective portion of a device area that is identified for any one defect may be the entire area within the device area in which the defect is located and may be affected by the defect. In some instances, an entire device area in which a defect has been detected and preferably verified may be identified as the defective portion of the device area. For example, in some cases, it may be useful to identify an entire cell, field, die, or other device area as a defective portion if a defect is detected, and preferably verified, in that cell, field, die, or other device area.

In one embodiment, such identifying is separately and independently performed for each of at least two or more of the device areas. For example, different device areas on different specimens can and most likely will have different defects detected therein. Therefore, the defective portions of each of the device areas may be separately determined based on only the defects detected, and preferably verified, in each of the device areas, respectively. In other words, the defective portions in a first device area on a first specimen may be identified based on only the defects detected in that first device area, the defective portions in a second device area on the first specimen may be identified based on only the defects detected in that second device area, and the defective portions in a third device area on a second specimen may be identified based on only the defects detected in the third device area. In this manner, when a defective portion is identified in one of the device areas on one of the specimens, the same areas in other device areas on the same and other specimens are not automatically identified as defective portions.

Some device areas may have defective portions in the same locations or areas as other device areas, however, when defects repeat at the same within device area location. However, since the embodiments described herein will use the non-defective portions of the device areas for generating a reference image, it is preferable that at least one non-defective instance of each of the locations within the device area is found within at least one device area on at least one of the specimens. If such a non-defective instance cannot be found for each of the locations within the device area, the virtual system may use one or more of various ways to extrapolate or infer the appropriate signals, data, or information for any locations that do not have non-defective samples.

As shown in step 308 of FIG. 3, the virtual system is also configured for eliminating the defective portions of the device areas from the device areas in which the defective portions were identified to thereby generate remaining portions of the device areas. In other words, the virtual system may eliminate any defective portions from the device areas in which they were identified thereby leaving only non-defective portions of the device areas. In some instances, eliminating the defective portions may include eliminating entire dies, fields, cells, etc. However, eliminating the defective portions may include eliminating only part(s) of a device area corresponding to the defective portions. In this manner, different device areas may have different eliminated portions and different remaining portions.

Eliminating the defective portions may be performed in a number of different ways. For example, eliminating the defective portions does not mean eliminating the defective portions on the physical specimens but means instead eliminating any data, signals, images, information, etc. generated for the defective portions from being used in further steps described herein. Eliminating the defective portions may therefore include deleting the data, signals, images, information, etc. for the defective portions from all of the data, signals, images, information, etc. generated for the multiple specimens. However, eliminating the defective portions does not necessarily require deleting or otherwise discarding such information. For example, eliminating the defective portions may simply include tagging, labeling, etc. the information generated for the defective portions in a manner that indicates it is not to be used for generating the reference image. Preserving the data or information in this way may be useful if the data or information can serve other purposes including any that might not be related to generating a reference image.

In one embodiment, the virtual system is configured for selecting the device areas on the specimens used for generating the reference image. In this manner, the virtual system may be configured for selecting the dies, fields, cells, or other device areas to be used for reference image generation. Selecting the device areas may be performed based on the remaining portions of the device areas. Selecting the device areas may include selecting all or only some of the remaining portions of the device areas. In other words, all of the remaining portions of all of the device areas may be selected and used for reference image generation or only some of the remaining portions may be eliminated from reference image generation. In addition, selecting the device areas may include selecting which of the device areas whose remaining portions are to be used for reference image generation. In other words, entire device areas may be eliminated from reference image generation. For example, if some of the device areas have only substantially small remaining portions, the virtual system may determine that those device areas are preferably not used for reference image generation because their overall defectivity may render their limited remaining portions skewed or otherwise unsuitable for reference image generation. In a similar manner, if a device area, regardless of its remaining portions, is located in the vicinity of other device areas that exhibit significant defectivity, that device area may not be selected for reference image generation because the defectivity of its neighboring or nearby device areas may have skewed or otherwise rendered the device area unsuitable for reference image generation. In this manner, the device areas may be selected for reference image generation based not only on their defectivity or remaining portions, but also on the defectivity or remaining portions of the device areas in their vicinity. In a similar manner, the virtual system may select the device areas based on the overall defectivity of the specimen on which they are located. For example, if the device areas on an entire specimen show abnormally high defectivity (e.g., compared to other specimens or based on the remaining portions in the device areas on the specimen), all of the device areas on that specimen may not be selected by the virtual system even if some of the device areas exhibit normal defectivity.

In one such embodiment, the selecting includes displaying information for the device areas to a user and selecting the device areas based on input received from the user. For example, the user can select device areas such as dies used for reference image generation from inspection and other results generated for multiple specimens. The information may be displayed to the user in any suitable manner, and the virtual system can receive the input from the user in any suitable manner. In one such example, the virtual system may generate maps of one or more of the device areas and/or the specimens with some labeling or indicia to illustrate which portions of the device areas are remaining portions and which portions are eliminated. The labels or indicia may include, for example, colors that indicate which locations or areas are included in remaining portions and which locations or areas are in eliminated portions. Such a map may be also displayed with any other data or information generated by any of the actual systems and/or virtual system for any of the multiple specimens. The user may then use the displayed information and any available input device (e.g., touchscreen, mouse, keyboard, etc.) to indicate which remaining portions are to be used for reference image generation and/or which are not. In this manner, the remaining portions used for reference image generation may be further limited based on those selected and/or rejected by a user.

The embodiments described herein are therefore different from currently used methods and systems for reference image generation because unlike those currently used systems and methods, the embodiments described herein do not generate reference images blindly from images generated from a specimen or specimens. In other words, one issue with currently used methods and systems for reference image generation is that they generate a reference image blindly with specimen data. As such, images generated from many defective device areas may be used to generate the reference image, which can shift the gray level of the reference image. In addition, a reference image is often generated for a new inspection process during the ramp up stage of device development and production. Since the fabrication processes are in the ramp up stage, most specimens produced by the fabrication processes may have substantially large numbers and many types of defects thereon. As such, device areas that can pass final test may be rare on such specimens and may be substantially hard to identify. In this situation, generating a "perfect" good device area suitable for a reference image will be challenging work. Otherwise, the reference image generated from defective device areas will be useless, which is also one reason why reference image type inspection is not widely adopted today.

The virtual system is further configured for generating a reference image from the output generated for the remaining portions of at least one of the device areas on a first of the specimens and at least one of the device areas on a second of the specimens. In this manner, the reference image will be generated from at least one device area on different specimens. The device areas on the different specimens used for reference image generation do not have to be located in the same areas on the specimens. For example, one device area on one specimen may be located in the center of the specimen while another device area on another specimen may be located near an edge of the specimen. In addition, while the device areas used for reference image generation preferably include at least one device area on different specimens, the device areas may include many more than just one device area on two different specimens. For example, the device areas may include any of the device areas that have not been eliminated due to defectivity.

The reference image generation described herein has, therefore, several advantages over currently used methods and systems for reference image generation. For example, since the reference image is generated based on multiple specimen information, the reference image generation can cover the specimen-to-specimen variation. In addition, identifying and eliminating defective portions of the device areas as described herein (e.g., defective dies and failure dies being "knocked out") prior to reference image generation will minimize the risk of defective pixels being involved in and having an effect on the reference image. Additional advantages of the embodiments are described further herein.

As shown in step 310, the virtual system is configured for generating a reference image from remaining portions of the device areas. The output used to generate the reference image is generated by only one of the actual systems. Generating the reference image may include combining the output generated for the remaining portions in any suitable manner such as by determining a median or mean on a location by location basis within the device areas using any of the output in the remaining areas. For example, a median or mean may be generated for location x, y in the device area from any of the output generated at location x, y in any of the remaining portions of the device areas. The output used to generate the reference image may be image data or image signals generated by the one actual system. In this manner, depending on the remaining portions of the device areas and the remaining portions of the device areas selected for reference image generation, there may be different numbers of samples for different locations in the device area available for reference image generation. Since the reference image will be generated on a location by location basis within the device area, different numbers of samples per location should not affect the reference image as long as there are a sufficient number of samples per location, e.g., 10 to 20 samples per location.

The output used to generate the reference image is preferably only the output generated for the multiple specimens by the actual system that will perform the process using the reference image. For example, if the reference image is generated for an inspection process, the initial inspection or any secondary inspection of the multiple specimens is preferably performed using the inspection tool that will use the reference image generated as described herein. Therefore, even if output is generated for the multiple specimens by other tools (e.g., defect review tools, electrical testers, etc.), the output used to generate the reference image is preferably only the output generated for the multiple specimens by the inspection tool that will perform the inspection process with the reference image.

In some embodiments, the virtual system is configured for storing the reference image in a recipe for the process performed on the specimen. A "recipe" is defined herein as a set of instructions that can be used by a tool or system to perform a process for a specimen. The virtual system may store the reference image in the recipe in a number of different ways. For example, the virtual system may store the actual reference image in the recipe itself. In another example, the virtual system may store information in the recipe (e.g., a file name and storage location) that can be used to access the reference image before or during performance of the process using the recipe. The virtual system may also store the reference image and/or the recipe in a number of different locations. For example, the virtual system may store the recipe and/or the reference image in the virtual system itself, in another storage medium coupled to the virtual system, in a storage medium or computer system of the actual system that will use the reference image to perform a process, etc.

The reference image generation performed by the embodiments described herein is therefore different in a number of important ways from currently used methods and systems for reference image generation. For example, the reference image generation described herein is based on information for multiple specimens, unlike most currently used reference image generation which is performed based on information for only one specimen. In another example, the reference image generation described herein will eliminate defective portions of the device areas (even entire defective dies and/or entire dies that fail electrical testing due to defects that were detected by inspection or were missed by inspection and detected by electrical testing) prior to reference image generation. In an additional example, the virtual systems described herein can be configured to allow a user to select device areas for reference image generation from multiple specimens. In a further example, the reference image generated by the embodiments described herein is recipe based, while currently used reference images are specimen based. In other words, the reference images described herein are particular to a recipe used to perform a process with the reference image while reference images generated by currently used methods and systems are particular to the specimen used to generate the reference image.

In another embodiment, the process performed for the specimen using the reference image is an inspection process. Such an inspection process may be referred to as a VIVA based "golden die" detection, when the device area is a die. The embodiments described herein are advantageous because they can generate a "perfect, golden" image using a VIVA with images generated by an advanced inspection or other imaging tool such as the BBP based inspection tools that are commercially available from KLA. The reference image generated in this manner can be stored on the VIVA and made available for use as an inspection reference. The inspection may be performed on the VIVA, e.g., by having the inspection tool send the output generated for a specimen being inspected to the VIVA, which performs the inspection using the stored reference image. The inspection may also be performed on the inspection tool, e.g., by having the VIVA send the reference image to the inspection tool for use in the inspection. Additional post-processing and detection that can work with the VIVA stored reference image can be used to achieve the best possible performance for defect detection. Some such post-processing and detection is described further herein. The post-processing and detection used for inspection performed with the VIVA stored reference image may, however, include any suitable post-processing and detection applications known in the art. In other words, the reference images described herein are not limited in the types of inspection in which they can be used.

Figure 4:
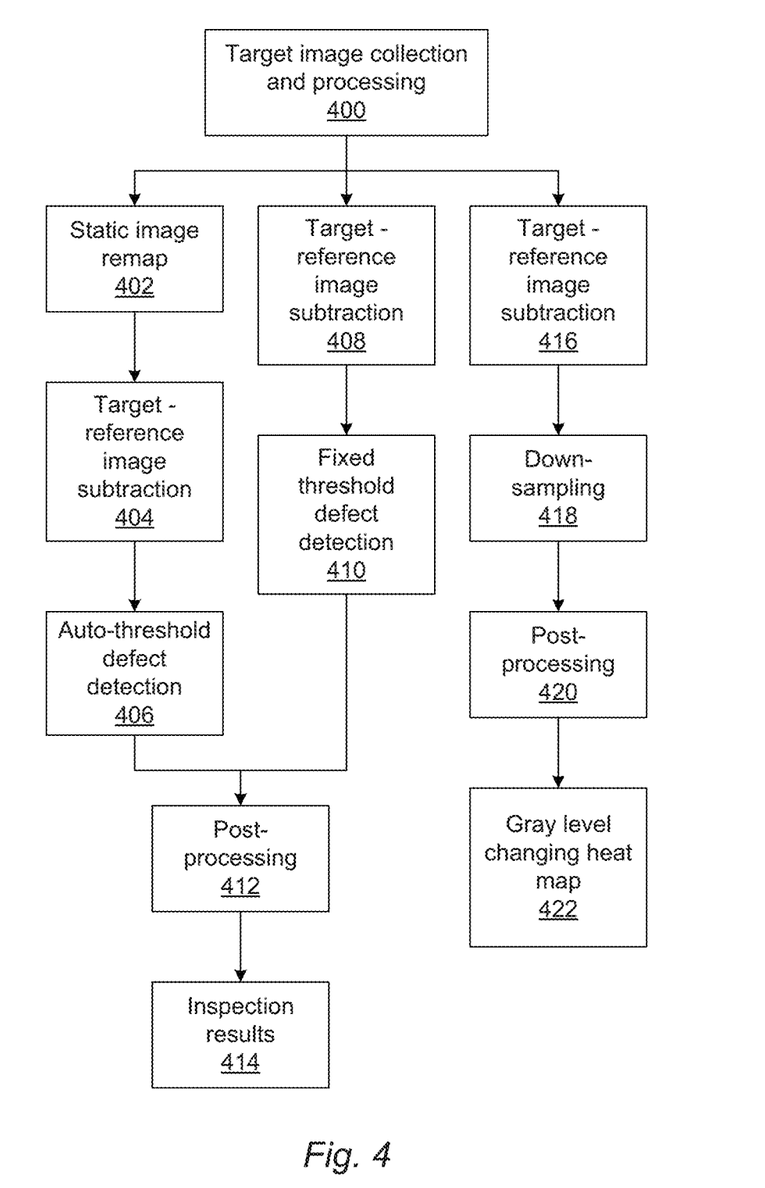
FIG. 4 is a flow chart illustrating one embodiment of steps for performing a process for a specimen using a reference image generated by the embodiments described herein.

FIG. 4 illustrates one embodiment for using the reference images generated as described herein for specimen inspection. As shown in step 400, the inspection process may include target image collection and processing. For example, an inspection tool may scan the specimen to generate images or other output for the specimen thereby collecting target images for the specimen. The processing performed in step 400 may include any processing that may be performed in inspection processes on raw output or images generated by detector(s) prior to defect detection.

In one such embodiment, the inspection process includes performing a static image remap in which all target images generated for the specimen in the inspection process are remapped to the reference image. For example, as shown in step 402 of FIG. 4, the inspection process may include static image remap 402. This static image remap is different from currently used inspection processes and provides certain advantages to the embodiments described herein. For example, for an auto-thresholding type defect detection (as is performed by defect detection algorithms such as the multi-die auto-thresholding (MDAT) algorithm that is used by some inspection tools commercially available from KLA), the static image remap can handle all the process variations. In particular, process variation and minor process changes can change the background gray level of output generated by scanning a specimen during an inspection process, which presents a common issue for defect detection, e.g., the process variation and minor process changes may cause variation in the specimen that can be erroneously detected as defects. The static image remap can therefore be advantageous for reference image type inspection because it can handle these process variations and process changes. In other words, for reference image type inspection described herein, the reference image is static so only the target image is remapped to account for process variation. The static image remap step may include remapping the test image to the reference image, which may be performed in any suitable manner known in the art. In addition, unlike currently used inspection processes, the static image remap uses the reference image generated as described herein as a static reference for target image remap. Inspection performed using the reference images generated as described herein can advantageously use the static image remap step to handle all of the process variations, making the inspection recipe threshold cutline stable.

As shown in step 404, the inspection process may include target-reference image subtraction. For example, the reference image generated as described herein may be aligned to the target images generated for the specimen being inspected in any suitable manner. The reference image may then be subtracted from the test images on a test image by test image basis. In this manner, difference images may be generated for each test image. The difference images may then be used for defect detection. For example, the difference images may be input to auto-threshold defect detection step 406 in which the MDAT algorithm or another suitable auto-thresholding defect detection algorithm detects defects in the device areas using the difference images.

The inspection process may also include target-reference image subtraction step 408, which may not be performed using the static image remapped test images. In this manner, target-reference image subtraction step 408 and target-reference image subtraction step 404 may be different steps that are separately and independently performed and may generate different difference images. The difference images generated by the image subtraction performed in step 408 may be input to fixed threshold defect detection step 410. Unlike defect detection step 406 which uses an auto-threshold, this defect detection step may use a fixed threshold (i.e., one that does not vary depending on the output generated for the device areas during inspection). In this manner, the inspection process may include two different types of detection, one performed with an auto-threshold and one performed with a fixed threshold. Performing both an auto-threshold detection and a fixed threshold detection in the inspection process may be advantageous since the fixed threshold defect detection may be particularly useful for detecting large area defects, e.g., full wafer under or over polish. Auto-thresholding defect detection algorithms can miss such large area defects after image remapping so the fixed threshold defect detection may be performed to detect those defects.

The defects that are detected by the different defect detection steps may be input to post-processing step 412, which may include any suitable post-processing known in the art. For example, for the defects detected using the auto-thresholding defect detection method, the post-processing may simply include exporting the results of the defect detection in a suitable format. For the fixed threshold detected defects, the post-processing may include exporting specimen/device area level gray level difference images with an extra flag in the inspection results file. The inspection tool may then generate inspection results as shown in step 414, which may include any suitable inspection results known in the art having any format known in the art (e.g., a defect map).

In another such embodiment, the inspection process includes generating a heat map showing differences in gray levels between target images generated for the specimen in the inspection process and the reference image and determining information for the specimen based on the heat map. For example, as shown in FIG. 4, the inspection process may include target-reference image subtraction step 416. This step may generate difference images that illustrate the differences between the target images and the reference image generated as described herein. Target-reference image subtraction step 416 may be different from and separately and independently performed from subtraction steps 404 and 408.

The inspection process may also include down-sampling step 418 performed on the difference images generated by subtraction step 416. Down-sampling may be performed for inspections that use substantially small pixel sizes (e.g., pixel sizes below 100 nm) for defect detection. For example, if difference information for every pixel having such sizes is exported, the heat map generated as described herein can get so large that it can be difficult to do any processing with it. The embodiments described herein may provide a user with the ability to choose how to down-sample the pixels to export a heat map having a reasonable size and resolution. The down-sampling step may be performed in any suitable manner known in the art. The inspection process may also include post-processing step 420 performed on results of the down-sampling step, which may include any suitable post-processing known in the art.

In addition, the inspection process may include gray level changing heat map generation step 422. Generating a gray level changing heat map using inspection results as described herein is a new concept for inspection. A gray level changing heat map is basically a map that shows the gray level differences between test image and reference image. The gray level changing heat map may be generated for an entire specimen or only an entire device area after down-sampling, which as described above is performed to reduce data size since the raw image data can be too big for exporting and processing.

The gray level changing heat map provides a new way for performing process monitoring. For example, there are many situations in fabricating 3D NAND and other devices where the wafer level gray level change will correlate to massive defects. Many of those issues can be buried defects, i.e., defects below the upper surface of the wafer, that are difficult for some inspections to detect. Once there are relatively large numbers of tiny buried defects in the same area, they will shift the whole area gray level. Therefore, the gray level changing heat map can be used to detect such shifts in large area gray levels and thereby detect possible buried or other defects that are undetectable by normal means. Such defect detection and other post-processing can be done based on this map.

In a further such embodiment, performing the inspection process with the reference image includes detecting repeating defects on the specimen. An advantage of the embodiments described herein is that they are capable of all repeating defect detection regardless of whether the repeating defects are 1×, 2×, or n× repeaters. For example, because the inspection process is performed using a reference image rather than an image from an adjacent device area (as would be done in die-to-die, cell-to-cell, or field-to-field inspection), the defects that repeat at the same location in multiple device areas will not cancel each other out in defect detection, which means that the repeater defect output will be retained thereby enabling their detection.

In addition, in previously used methods and systems for reference image generation, if a defect is present at the same within device area location in each (or even multiple) device areas used to generate the reference image, the reference image may actually be generated with a defect image at that location. For example, without analysis of the output generated for the device areas used to generate the reference image and elimination of any portions of the device areas that are defective, when defects are present at the same within device area location in all (or even several) instances of the device areas, the defects may not be eliminated when the output for multiple device areas are combined. Instead, the defects may be enhanced or at least retained to some degree in the reference image, which when used for defect detection could reduce the signal-to-noise ratio of defects that may be present on other specimens at the same location below detectable levels.

One example of an application in which the embodiments described herein can be useful for repeater detection is for 3D NAND under-etch issues. For example, even if under-etch defects produce a sufficient signal-to-noise ratio in the scanning results, because this under-etch issue is a full wafer issue, the under-etch defects will occur in each device area at the same within device area locations. Therefore, if the defect detection involves device area to device area comparisons, the defect detection won't be able to detect any of these defects. The reference images generated as described herein can however be used to detect such defects because they will not contain any measurable defect signals.

In some embodiments, multiple tools independently perform the process for other specimens of the same type as the specimen using the reference image. For example, if the reference image is generated for use in an inspection process, multiple inspection tools may perform the inspection process on different specimens using the same reference image. The different inspection tools may access, acquire, or store the reference image as described further herein. The multiple tools may perform the same process for other specimens of the same type. The specimens may have the same type in that they may all be specimens on which the same design for a device area is being formed and the specimen layer for which the process is performed is the same. For example, specimens having the same type may be wafers on which the same devices are being formed, and the process may be performed for the same layer on the wafers.

In one such embodiment, the virtual system is configured for comparing results generated by the multiple tools independently performing the process and monitoring the multiple tools based on results of the comparing. For example, one advantage of the embodiments described herein is that any process performed using the reference image is recipe based, and all the instances of the process use the same reference image. In this manner, the performance of the tools used to perform the process will be effectively normalized to the same reference image. Therefore, performance matching and troubleshooting between tools will be easier. Performance matching and troubleshooting between tools may otherwise be performed in any suitable manner known in the art.

In another embodiment, the identifying, eliminating, and generating steps described herein reduce effects of large area defects on the specimens in the reference image. A "large area defect" as that term is used herein is a defect having an area that spans at least a majority of at least one device area on the specimen and/or a defect having an area that is large enough to extend at least partially across two or more of the device areas. In other words, a large area defect will be at least larger and most likely significantly larger than a point defect. One example of a large area defect is residue such as one or more materials that a process failed to completely remove from a specimen and that cover a substantially large area on the specimens. For example, a chemical-mechanical polishing process may fail to sufficiently planarize one or more materials in a relatively large area on a specimen thereby resulting in unwanted material remaining on the specimen, which can skew a reference image generated from such a specimen. One advantage of the embodiments described herein is therefore that the embodiments close the gap of large area defects (i.e., defects that impact multiple device areas which will therefore shift the specimen base reference). For example, the identifying and eliminating steps described herein can be used to eliminate all kinds of defects including relatively large area defects from the output used to generate the reference image. As such, the reference images generated as described herein will be effectively immune to large area defects that may be present on the specimens used to generate the reference images.

Although the reference images generated as described herein are particularly suitable for use in inspection processes, the reference images may have applications in other processes as well. For example, the reference images may be useful for alignment of output generated for two or more device areas on a specimen to the reference image and therefore to a common instance of the device area. In this manner, aligning images for different device areas to the reference image effectively aligns the different device area images to each other. Such alignment may be performed in different processes such as metrology, defect review, defect analysis, etc. In addition, the reference image may be used in defect review processes to compare potential defect signals or images to the signals or images at the same locations in the reference image, which can aid in the defect classification and verification. The reference image can also be used in defect classifier training as a training image labeled as a non-defective instance of the device area. Furthermore, the reference images generated as described herein may be used in the same manner as any other reference image generated in any other manner. In other words, the reference images generated as described herein are not necessarily limited in the applications for which they would be useful.

All of the embodiments described herein may include storing results of one or more steps performed by the embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Such functions include, but are not limited to, altering a process such as a fabrication process or step that was or will be performed on the specimen in a feedback or feedforward manner. For example, the virtual system and other computer systems described herein may be configured to determine one or more changes to a process that was performed on a specimen inspected as described herein and/or a process that will be performed on the specimen based on the detected defect(s). The changes to the process may include any suitable changes to one or more parameters of the process. The virtual system and/or other computer systems described herein preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The virtual system and other computer systems described herein may determine such changes in any suitable manner known in the art.

Those changes can then be sent to a semiconductor fabrication system (not shown) or a storage medium (not shown) accessible to the virtual system or other computer systems described herein and the semiconductor fabrication system. The semiconductor fabrication system may or may not be part of the system embodiments described herein. For example, the virtual system and other computer systems described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of each of the systems described above may be combined together into one single embodiment.

Another embodiment relates to a computer-implemented method for generating a reference image for use in a process performed for a specimen. The method includes receiving output generated by actual systems for specimens. Each of the specimens has device areas of the same type formed thereon, and the output generated by the actual systems for the specimens is for the same layer on the specimen. The actual systems may be configured as described herein. The method also includes identifying defective portions of the device areas based on the output generated for the specimens by at least two of the actual systems. In addition, the method includes eliminating the defective portions of the device areas from the device areas in which the defective portions were identified to thereby generate remaining portions of the device areas. The method further includes generating a reference image from the output generated for the remaining portions of at least one of the device areas on a first of the specimens and at least one of the device areas on a second of the specimens. The receiving, identifying, eliminating, and generating steps are performed by a virtual system coupled to the actual systems. The virtual system is configured as described further herein.

Each of the steps of the method may be performed as described further herein. The method may also include any other step(s) that can be performed by the system embodiments described herein. In addition, the method described above may be performed by any of the system embodiments described herein.

Figure 5:
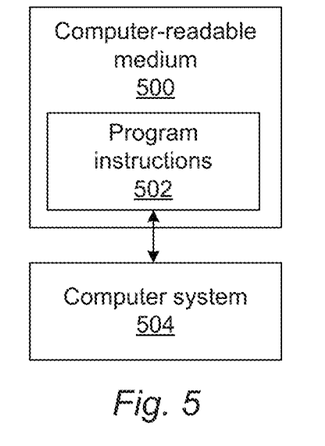
FIG. 5 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for generating a reference image for use in a process performed for a specimen. One such embodiment is shown in FIG. 5. In particular, as shown in FIG. 5, non-transitory computer-readable medium 500 includes program instructions 502 executable on computer system 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 504 may be configured according to any of the embodiments described herein.

Further modifications and alternative embodiments of various aspects of the invention will be apparent to those skilled in the art in view of this description. For example, methods and systems for generating a reference image for use in a process performed for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to generate a reference image for use in a process performed for a specimen, comprising:
    a virtual system coupled to actual systems to thereby receive output generated by the actual systems for specimens, wherein the virtual system comprises at least a computer system and a storage medium, wherein the virtual system is not capable of having the specimens disposed therein, wherein each of the specimens has device areas of a same type formed thereon, wherein the output generated by the actual systems for the specimens is for a same layer on the specimens, and wherein the virtual system is configured for:
    identifying defective portions of the device areas based on output generated for the specimens by at least two of the actual systems;

eliminating the defective portions of the device areas from the device areas in which the defective portions were identified to thereby generate remaining portions of the device areas; and generating a reference image from output generated for remaining portions of at least one of the device areas on a first of the specimens and at least one of the device areas on a second of the specimens, wherein the output used to generate the reference image is generated by only one of the actual systems.

2. The system of claim 1, wherein said identifying is separately and independently performed for each of at least two or more of the device areas.

3. The system of claim 1, wherein the device areas are dies on the specimens.

4. The system of claim 1, wherein the device areas are fields on the specimens.

5. The system of claim 1, wherein the device areas are cells on the specimens.

6. The system of claim 1, wherein the actual systems are configured to perform one or more processes on the specimens while the specimens are disposed within the actual systems to thereby generate the output generated by the actual systems for the specimens.

7. The system of claim 1, wherein the actual systems comprise at least one inspection tool and at least one other tool.

8. The system of claim 7, wherein the at least one other tool comprises a defect review tool.

9. The system of claim 7, wherein the at least one other tool comprises a different inspection tool.

10. The system of claim 7, wherein the at least one other tool comprises an electrical tester.

11. The system of claim 7, wherein the at least one other tool comprises a combination of two or more of a defect review tool, a different inspection tool, and an electrical tester.

12. The system of claim 1, wherein the virtual system is further configured for selecting the device areas on the specimens used for generating the reference image, and wherein said selecting comprises displaying information for the device areas to a user and selecting the device areas based on input received from the user.

13. The system of claim 1, wherein the virtual system is further configured for storing the reference image in a recipe for the process performed for the specimen.

14. The system of claim 1, wherein the process performed for the specimen using the reference image is an inspection process.

15. The system of claim 14, wherein the inspection process comprises performing a static image remap in which all target images generated for the specimen in the inspection process are remapped to the reference image.

16. The system of claim 14, wherein the inspection process comprises generating a heat map showing differences in gray levels between target images generated for the specimen in the inspection process and the reference image and determining information for the specimen based on the heat map.

17. The system of claim 14, wherein performing the inspection process with the reference image comprises detecting repeating defects on the specimen.

18. The system of claim 1, wherein multiple tools independently perform the process for other specimens of a same type as the specimen using the reference image.

19. The system of claim 18, wherein the virtual system is further configured for comparing results generated by the multiple tools independently performing the process and monitoring the multiple tools based on results of said comparing.

20. The system of claim 1, wherein said identifying, said eliminating, and said generating reduce effects of large area defects on the specimens in the reference image.

21. The system of claim 1, wherein the specimens comprise wafers.

22. A non-transitory computer-readable medium, storing program instructions executable on a computer system for performing a computer-implemented method for generating a reference image for use in a process performed for a specimen, wherein the computer-implemented method comprises:

receiving output generated by actual systems for specimens, wherein each of the specimens has device areas of a same type formed thereon, and wherein the output generated by the actual systems for the specimens is for a same layer on the specimens;

identifying defective portions of the device areas based on output generated for the specimens by at least two of the actual systems;

eliminating the defective portions of the device areas from the device areas in which the defective portions were identified to thereby generate remaining portions of the device areas; and generating a reference image from output generated for remaining portions of at least one of the device areas on a first of the specimens and at least one of the device areas on a second of the specimens, wherein said receiving, identifying, eliminating, and generating are performed by a virtual system coupled to the actual systems, wherein the virtual system comprises at least the computer system and a storage medium, and wherein the virtual system is not capable of having the specimens disposed therein.

23. A computer-implemented method for generating a reference image for use in a process performed for a specimen, comprising:

receiving output generated by actual systems for specimens, wherein each of the specimens has device areas of a same type formed thereon, and wherein the output generated by the actual systems for the specimens is for a same layer on the specimens;

identifying defective portions of the device areas based on output generated for the specimens by at least two of the actual systems;

eliminating the defective portions of the device areas from the device areas in which the defective portions were identified to thereby generate remaining portions of the device areas; and generating a reference image from output generated for remaining portions of at least one of the device areas on a first of the specimens and at least one of the device areas on a second of the specimens, wherein said receiving, identifying, eliminating, and generating are performed by a virtual system coupled to the actual systems, wherein the virtual system comprises at least a computer system and a storage medium, and wherein the virtual system is not capable of having the specimens disposed therein.

\* \* \* \* \*